June 10, 1958 M. ALIMANESTIANO 2,838,186
AUTOMOBILE PARKING APPARATUS
Filed July 30, 1953 4 Sheets-Sheet 1
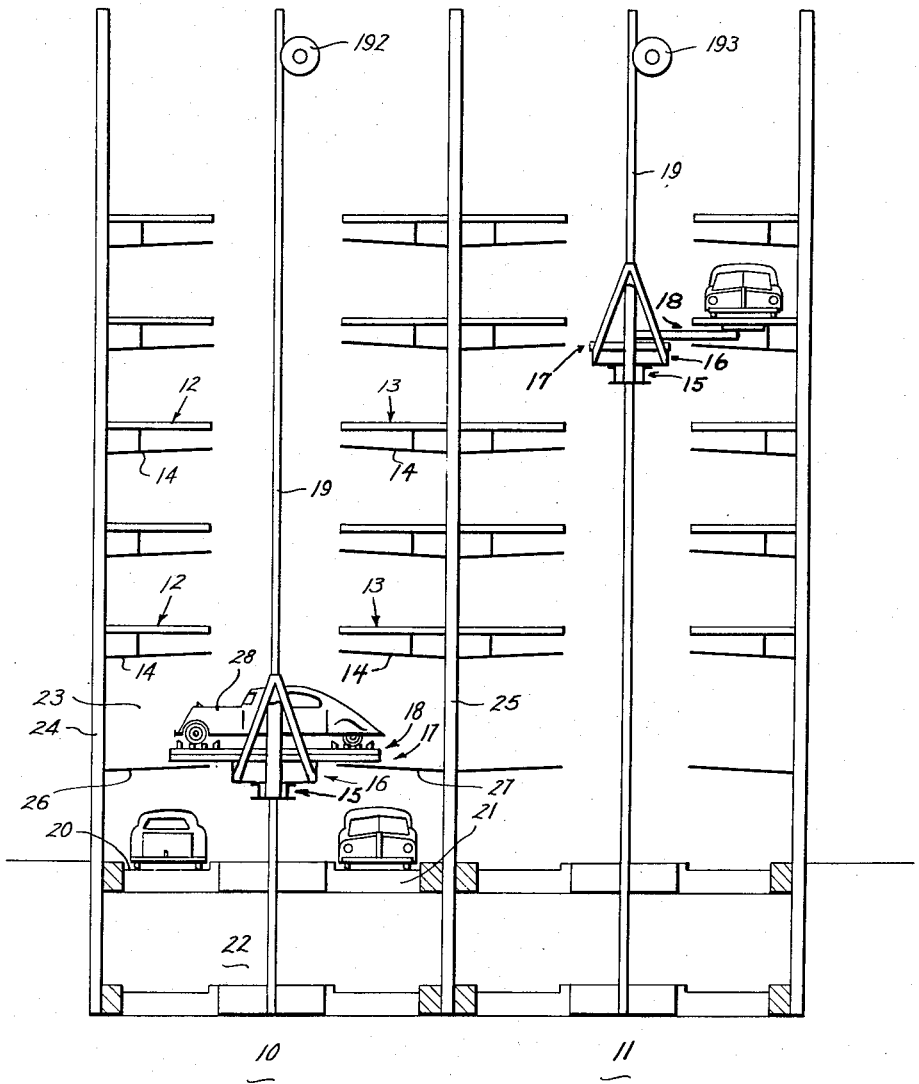
Mihai Alimanestiano
INVENTOR.
BY Murray Robinson
ATTORNEY

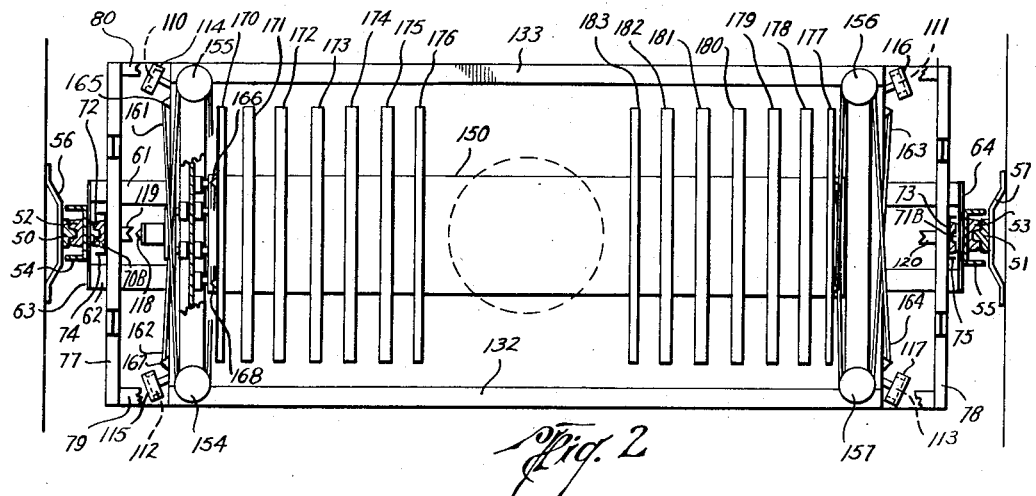

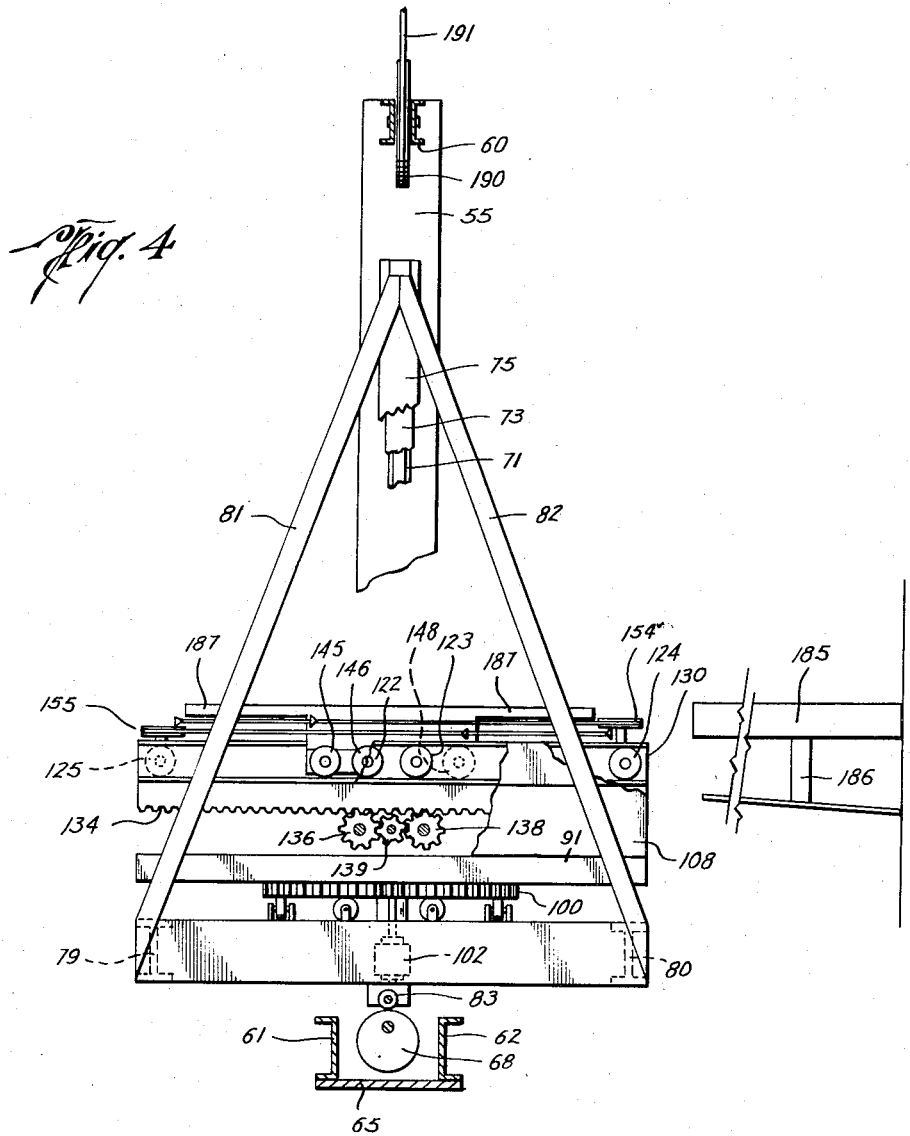

Mihai Alimanestiano
INVENTOR.

United States Patent Office 2,838,186
Patented June 10, 1958

2,838,186

AUTOMOBILE PARKING APPARATUS

Mihai Alimanestiano, Bellaire, Tex., assignor, by direct and mesne assignments, to Speed-Park, Inc., a corporation of New York Application July 30, 1953, Serial No. 371,211

12 Claims. (Cl. 214—16.1)

This invention pertains to apparatus for parking automobiles. The present application is a continuation-in-part of my prior application Serial Number 97,021 filed June 3, 1949, entitled "Apparatus for Parking Automobiles," now Patent Number 2,647,647.

Briefly stated, the preferred form of the apparatus for parking automobiles described in my aforesaid application comprises a primary elevator arranged to move vertically up and down between two vertical columns of shelves disposed on opposite sides of the elevator, each shelf comprising a plurality of spaced apart parallel beams perpendicular to the sides of the elevator. A horizontal conveyor carried up and down by the elevator is used to transfer automobiles sideways between the elevator and any selected shelf. The conveyor also comprises a plurality of spaced apart parallel beams which are adapted to intermesh with those of the shelves. A slight vertical motion of the conveyor relative to a shelf with which it is in mesh suffices to transfer an automobile from conveyor to shelf or vice-versa. This is preferably accomplished by means of a secondary elevator between the primary elevator and the horizontal conveyor. An automobile to be parked is driven onto a shelf near street level, transferred sideways to the elevator by the conveyor, carried to the level of a shelf at a level removed from street level, and transferred to the latter shelf by the conveyor, the reverse procedure being followed in delivering the automobile to the customer.

The principal object of the present invention is to adapt the principle of the turntable to an automobile parking apparatus of the general type disclosed in my aforesaid prior application, in order to make such apparatus better adapted for use in locations where street access is available at only one side of the apparatus and turning space is not economically available, in which case the turntable makes possible the reversal of direction of an automobile so that it need not be backed in or out of the apparatus.

A major problem to be faced in adapting the turntable principle to such parking apparatus lies in the fact that the width of the elevator shaftway as defined by the space between the columns of shelves, is less than the length of an automobile, so that an automobile on the elevator cannot be turned around without extending out of the shaftway into the shelf space. Even in the absence of other automobiles occupying the shelf space where the turn is attempted, it is not possible to make the turn at the level of a shelf because of interference by the shelf, nor at a level between shelves because the height between shelves is just sufficient to accommodate an automobile so that if a turn is atttempted with the elevator above the level of one shelf the top of the automobile would strike the shelf next above. It should be noted that this latter phase of the problem arises because of the type of conveyor used. The conveyor beams intermesh with those of each shelf rather than moving out above them, so that the intershelf height need be not substantially greater than that of an automobile. Furthermore, because the conveyor beams are supported from underneath, it is necessary to raise the conveyor beams a considerable height above the shelf beams in order to clear the shelf for a turn.

Although as noted above, there is a major problem in adapting the turntable principle to such apparatus, there is an advantage in such apparatus over other apparatuses in which the automobiles are delivered to the shelves endways, i. e., in the same direction as they are driven, in that the elevator guides are at the ends of the elevator shaftway, rather than at the sides, so that the guides do not interfere with the turning of the car. Furthermore, since the conveyor beams are supported from underneath by means which does not extend out to the sides beyond the ends of the intermeshing portions of the conveyor there is no interference from the conveyor supporting means.

Another object of the invention is to provide improved forms of primary and secondary elevators, turntable, horizontal conveyor, and drive means therefor, all of which are simpler to construct and maintain and more efficient and reliable in operation.

Other objects and advantages of the invention will appear from the following description of a preferred embodiment thereof, reference being made to the accompanying drawings wherein:

Figure 1 is a semi-schematic front elevation of an apparatus embodying the invention;

Figure 2 is a horizontal section taken along line 2—2 of Figure 3 showing the elevator, secondary elevator, turntable, and horizontal conveyor, part of the apparatus shown in Figure 1;

Figure 3 is a side elevation of the conveyor, turntable and elevators; and

Figure 4 is a vertical section taken on line 4—4 of Figure 3;

Figure 5:
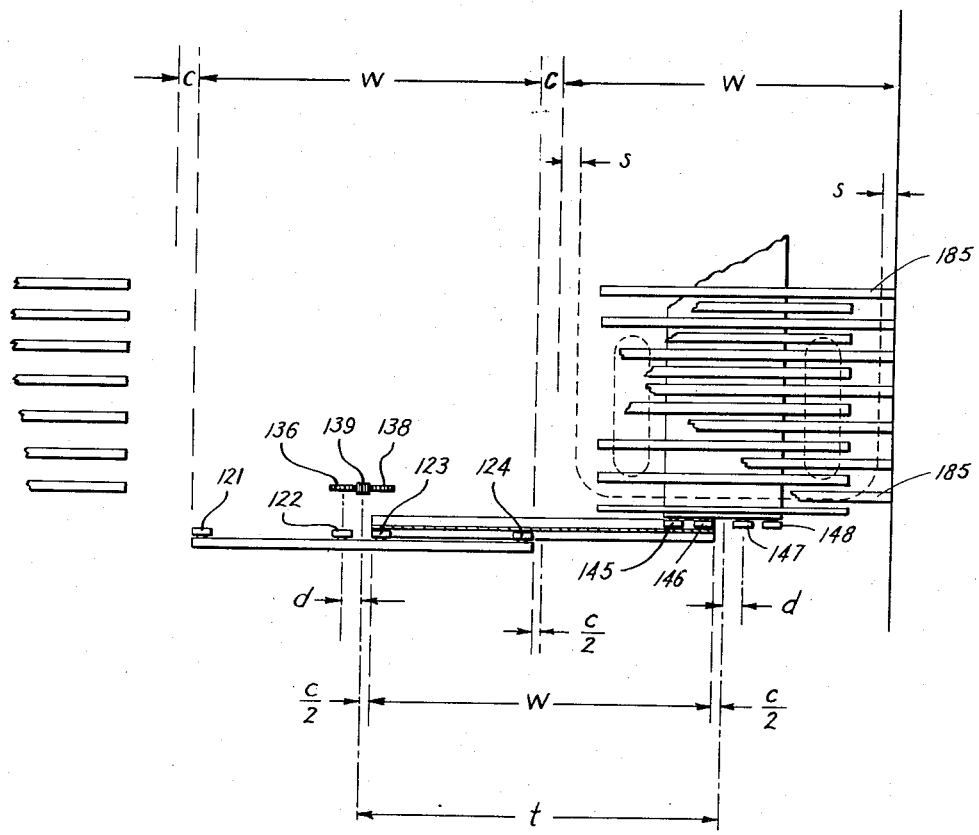
Figure 5 is a schematic plan view of the conveyor and shelves.

Referring now to Figure 1 there is shown an apparatus according to the invention which may be termed a garage. The garage comprises a plurality of units or towers such as 10 and 11 disposed in rows, side by side and end to end. Each tower includes two columns of shelves such as the shelves 12 and 13, beneath which are disposed suitable catch pans such as 14, which may be of the type described in greater detail in my co-pending application S. N. 97,021 filed June 3, 1949, now Patent No. 2,647,647, entitled "Apparatus for Parking Automobiles."

Between the shelves is an elevator shaftway in which travels an elevator 15 on which are mounted a secondary elevator 16, a turntable 17 and a horizontal conveyor 18. As shown in Figure 1 the conveyor is turned at right angles to its normal position, in order to illustrate how the turntable operates. The elevator is raised and lowered by means of a cable 191 (see Figure 4) which is wound on motor driven winch 192 (Figure 1). The elevator travels between a pair of guide rails supported by columns, such as 19.

Shelfways such as 20, 21, are provided for entrance and exit respectively, a shelfway comprising a set of shelf beams plus a driveway leading to it from the street. Beneath the shelfways 20, 21, there is a basement 22 to facilitate maintenance of the equipment. Above the shelfways is a mezzanine space 23 which is used for turning. Shelf spaces defined by shelves such as 12, 13, are at regular intervals above the mezzanine, supported by suitable means including columns such as 24, 25.

In operation, an automobile is driven onto a ground level shelf via a shelfway such as 20, is picked up by the conveyor and placed over the elevator, and then carried to the mezzanine. The mezzanine is devoid of shelves, being provided only with catch pans 26, 27, so that when the turntable is operated to revolve the conveyor and automobile 28, there will be no interference. After the conveyor and automobile have been turned 180 degrees they are lifted by the elevator and through the elevator shaftway until the automobile is opposite an empty shelf space where the automobile is deposited by the conveyor, as shown in tower 11. When the automobile is called for, the elevator and conveyor return it to street level and place it on shelfway 21 from which it is ready to be driven away in a forward direction.

Referring now to Figures 2, 3, and 4, and more especially to Figure 3, there are shown guide rails 50, 51, on which travel primary elevator guides 52, 53 carried by end columns or slings 54, 55 of the elevator frames. The guide rails are supported by brackets such as 56, 57, 58, 59, from adjacent wall structure, shown only schematically, forming part of the tower structure. The elevator columns are connected together at the top by beam 60 and at the bottom by the elevator floor comprising beams 61, 62, end plates 63, 64, and bottom plate 65. Between the floor beams 60, 61 is rotatably mounted a shaft 66 driven by electric motor and reduction gear 67, and carrying a pair of eccentrics 68, 69.

On the inside of elevator columns 52, 53, are mounted inner guide rails 70A, 70B, 71A, 71B, on which travel secondary elevator guides 72, 73, mounted on secondary elevator columns 74, 75. Columns 74, 75, are connected at the top by beam 76. Connected to the bottoms of columns 74, 75 are transverse beams 77, 78, which are connected together by beams 79, 80. Diagonal braces 81, 82, at one end and similar braces such as 83 at the other complete the framework of the secondary elevator. Cam followers 83, 84, rotatably mounted underneath secondary elevator support it on top of eccentrics 68, 69.

A shaft 90 is fixedly mounted in the center of the lower portion of the secondary elevator and a turntable 91 is rotatably mounted on the upper end of the shaft. A plurality of rollers such as 92, 93, 94, 95 are rotatably mounted on the top of the lower portion of the secondary elevator and support the turntable for rotation about shaft 90. A gear 100 secured to the underside of the turntable is adapted to be driven by pinion 101 which is mounted on the shaft of electric motor 102 which is carried by the secondary elevator.

At the corners of the turntable carried by the end walls 108, 109 thereof are rotatably mounted four stabilizing rollers 110, 111, 112, 113, adapted to lie in channels 114—117 carried by the secondary elevator. Channels 114—117, as shown in plan view in Figure 2 and in elevation in Figure 3, are short channels but little longer than the diameter of rollers 110—113. Channels 114, 116 and rollers 110, 111 are at a level above channels 115, 117 and rollers 112, 113 so that the upper rollers do not pass through the lower channels and the lower rollers do not pass through the upper channels when the turntable has been turned in either direction through the angle between its diagonals, thereby avoiding an unnecessary contact. The stabilizing rollers lie in the channels when the turntable is in a normal position in which the conveyor carried thereby is aligned with the secondary elevator as shown in Figures 2–4. To keep the turntable in normal position it is provided with a solenoid actuated latch 118 adapted to engage either of the catches 119, 120 secured to the secondary elevator at opposite ends thereof.

Inside the end walls 108, 109 of the turntable are rotatably mounted two horizontal rows of four rollers each, one row at each end, such as rollers 121, 122, 123, 124, 125, 128 which lie within the channels at one side of and support H beams 130, 131, forming the ends of the lower section of the conveyor. Connecting the bottom flanges of the H beams 130, 131 are two beams 132, 133. Underneath these beams and parallel to H beams 130, 131 are connected racks 134, 135, which are driven by gears 136, 137, 138, and a fourth gear not visible in the drawing. These gears are driven in pairs by pinions such as 139 connected to shaft 140 which is connected at 141 to electric motor 142.

The upper section of the conveyor comprises a girder 150 on each of the ends of which are rotatably mounted four rollers such as 145, 146, 147, 148, 152 which travel in the side channels of H beams 130, 131, on the opposite sides thereof from rollers 121—128. The inner pair of rollers on each end of girder 150 is concentric with the inner pair of rollers of the adjacent row of rollers carried by the turntable. On top of each of H beams 130, 131, at each end thereof is rotatably mounted a sheave as shown at 154, 155, 156, 157. Four cables 161—164 are each looped around one of the sheaves 154—157 and each is secured at one end to the turntable and at the other to the upper section of the conveyor, for example cable 161 is connected to the turntable at 165 and to the upper section of the conveyor at 166, and cable 162 is connected to the turntable at 167 and to the upper section of the conveyor at 168, whereby motion of the lower section of the conveyor relative to the turntable causes an equal motion of the upper section of the conveyor relative to the lower section.

Secured on top of the girder 150 and parallel to H beams 130, 131 are a plurality of T-shaped beams 170—183. As explained more fully in my aforementioned prior application, the distance between the top of each beam and the top of the girder 150 is greater than the height of the shelf beams such as 185 (Figure 4), and the distance between the top of each shelf beam and the top of the supporting beam such as 186 is greater than the height of the end portions such as 186 of each conveyor beam, in order that the conveyor can move vertically relative to a shelf with which it is in mesh to transfer load therebetween. The conveyor beams are disposed in two groups, one group to support the front wheels of an automobile and one group to support the rear wheels. The beams 170, 176, 177, 183 are somewhat higher than the other beams to prevent an automobile from rolling off the conveyor beams, as best shown in Figure 1.

As shown in Figure 5, the width of the upper section of the conveyor is somewhat less than the width of a shelf since the sides of an automobile extend beyond the wheels and the conveyor need support only the wheels. Figure 5 also shows a clearance C between each shelf and the conveyor support (e. g. turntable). Because of this clearance each conveyor section must travel until its center line is past the center line of the element next below by a distance C/2 greater than half the width W of the conveyor supports. The axes of the inner pairs of rollers 122, 123, 146, 147 are placed so the rollers will still support the conveyor sections when the conveyor is fully extended. The distance between inner and outer rollers is made as large as possible.

As shown in Figure 3, a pair of sheaves 189, 190 are rotatably mounted on beam 60 at the top of the primary elevator frame. A cable, such as 191 shown in Figure 4, is passed around each sheave and connected to a motor driven winch such as 192, 193 (Figure 1) for raising and lowering the primary elevator.

In the embodiment of the invention just described, the secondary elevator 16 is raised and lowered relative to the primary elevator by means of rotation of the eccentrics 68, 69, and the turntable 17 is rotated relative to the secondary elevator by means of gear 100 driven by pinion 101. If desired, the turntable could be mounted directly on the primary elevator and the secondary elevator could be interposed between the turntable and conveyor. However, with such an arrangement the guide rails 70A, 70B, 71A, 71B, for the secondary elevator could not be mounted on the inner faces of the columns 54—55 of the primary elevator and additional supports would have to be provided on the turntable to carry the guide rails, thus increasing the complexity of the apparatus. Furthermore, it is preferable to have as few parts as possible rotate relative to the primary elevator so that the embodiment illustrated in the drawings is preferred.

It is to be noted that as distinguishes from the construction shown in my aforementioned prior application S. N. 97,021, now Patent No. 2,647,647, the primary elevator is of relatively narrow width compared to the width of the elevator shaftway and the width of the conveyor. In my aforementioned application the primary elevator was substantially equal in width to the width of the elevator shaftway and conveyor in order that the jacks supporting the secondary elevator and conveyor would be placed at horizontal distances sufficiently far apart to reduce the local forces needed to produce a torque sufficient to balance that of the loaded conveyor when extended into the shelf space. In the present construction the forces providing the balancing torque are applied to the secondary elevator by the vertical guides which are spaced apart vertically a considerable distance, so that the primary elevator need have no great width and can be a simple rectangular frame disposed in a vertical plane. This arrangement takes the torque off the means used to raise and lower the secondary elevator, which makes such means easier to construct. Also, since the raising and lowering means need not be distributed horizontally it can be localized in one place, thereby avoiding the necessity of synchronizing the raising and lowering movements of several horizontally spaced apart elements.

A further improvement to be noted is the integral construction of the conveyor which assures that the portions thereof supporting the front and rear wheels of an automobile will move together and eliminate the need for synchronizing means.

The cables used to move the upper section of the conveyor relative to the lower section also incorporate an improvement. By using two cables and two pairs of sheaves at each end of the conveyor, it is possible to move the upper conveyor section past the lower conveyor section a full half of its width and move even though the distance between the centers of the sheaves is less than the width of the lower conveyor section, thereby making possible the use of a lower conveyor section of less width than that shown in my above referred to prior application. This reduces to a minimum the necessary width of the elevator shaftway, that is, the distance between the opposite columns of shelves, such width now being determined by the clearance needed to pass the lower section of the conveyor. This point will be further clarified by a study of Figure 5. It should also be pointed out that since the lower conveyor section travels over half its width it is necessary to provide horizontally spaced and synchronized gears for driving the racks in order that the racks will also be in engagement with the gears. This is taken care of by the dual drive gears 136, 138, and common pinion 139.

It is to be noted that the advantages of the improved forms of primary elevator, secondary elevator, conveyor, and the means for raising and lowering the secondary elevator and moving the conveyor back and forth horizontally can be realized in embodiments of the invention not incorporating the turntable, in which case the lower section of the conveyor would be supported by rollers similar to 125, 126 carried by channels similar to 130, 131 mounted directly on the secondary elevator at the ends thereof. Such an arrangement is suitable for a garage having access at both front and rear so that automobiles can come in at one end of the garage and leave at the other end without turning around. Such arrangement is also suitable for garages having sufficient room at the side to allow for turning, for example, at the basement level, in which case automobiles could enter the basement via ramps, turn around, and later leave at the ground level.

Certain phases of the invention may be used in garages not employing vertical columns of shelves and a primary elevator, for example, horizontal rows of shelves and a horizontal transportation device can be used as shown for example in my aforesaid prior application. Also the invention can be used for transporting other things than automobiles.

While a preferred embodiment of the invention has been shown and described and certain modifications have been described, many other modifications thereof can be made by one skilled in the art without departing from the spirit of the invention, and it is desired to protect by Letters Patent all forms of the invention falling within the scope of the following claims.

I claim:

1. Transfer and storage apparatus comprising two sets of generally elongated rectangular superposed vertically spaced shelves, said sets being spaced apart horizontally and disposed directly opposite each other with the lengths of the shelves in one set parallel to the lengths of the shelves in the other set and defining therebetween an elevator shaftway with one side of each shelf in one set adjacent one side of the shaftway and one side of each shelf in the other set adjacent the opposite side of the shaftway, the shaftway thus defined being of generally elongated rectangular horizontal cross-section with its length parallel to the lengths of the shelves, vertically extending elevator guide means at each end of the elevator shaftway, an elevator disposed with its length parallel to the length of the shelves and mounted between said guide means for movement up and down between the top and bottom of said shaftway, means for raising and lowering the elevator, second vertically extending guide means carried by said primary elevator at each end of said primary elevator, a secondary elevator disposed with its length parallel to that of the primary elevator, means mounting said secondary elevator between said second guide means for movement up and down relative to the primary elevator, means for raising and lowering the secondary elevator relative to the primary elevator, a turntable mounted on the secondary elevator for rotation about a vertical axis, an elongated generally rectangular conveyor carried by said turntable, the length of said conveyor being greater than the width of said shaftway, said conveyor and each of said shelves each comprising a plurality of horizontally spaced apart parallel elongated members, the shelf members running transverse to said one side of the shelf, means operable when the conveyor is at a different level from the levels of said shelves for turning the turntable between one normal position in which the conveyor members are parallel to the shelf members and another normal position 180 degrees therefrom in which the conveyor members are again parallel to said shelf members, the ends of said conveyor extending out of the shaftway and passing through the intershelf spaces at opposite sides of the elevator as the turntable is rotated to turn the conveyor from one normal position to the other, and means operable when said turntable is in one of its normal positions and the conveyor is at the same level as a shelf for extending the conveyor horizontally to intermesh its members with those of the colevel shelf to transfer a load between the conveyor and shelf upon change in the level of the conveyor relative to the shelf, said second guide means for said secondary elevator extending above and below said conveyor and said mounting means for said secondary elevator including means at the ends of said secondary elevator engaging said guide means above and below said conveyor, a distance between the uppermost and lowermost points of engagement of the last said means with said second guide means being greater than the width of said elevator shaftway to facilitate resistance to torque due to extension of the conveyor to transfer a load between a shelf and the conveyor.

2. Transfer and storage apparatus comprising two sets of generally elongated rectangular superposed vertically spaced shelves, said sets being spaced apart horizontally and disposed directly opposite each other with the lengths of the shelves in one set parallel to the lengths of the shelves in the other set and defining therebetween an elevator shaftway with one side of each shelf in one set adjacent one side of the shaftway and one side of each shelf in the other set adjacent the opposite side of the shaftway, the shaftway thus defined being of generally elongated rectangular horizontal cross-section with its length parallel to the lengths of the shelves, the series of levels of the shelves in each set being the same as those in the other set, the vertical spacing of the shelves in each set being equal except that the space between one pair of shelves near ground level and the adjacent pair of shelves thereabove is approximately twice the spacing of the other shelves to provide a mazzanine level having no shelves, vertically extending elevator guide means at each end of the elevator shaftway, an elevator disposed with its length parallel to the length of the shelves and mounted between said guide means for movement up and down between the top and bottom of said shaftway, means for raising and lowering the elevator, a turntable mounted on the elevator for rotation about a vertical axis, an elongated generally rectangular conveyor carried by said turntable, the length of said conveyor being greater than the width of said shaftway, said conveyor and each of said shelves each comprising a plurality of horizontally spaced apart parallel elongated members, the shelf members running transverse to said one side of the shelf, means operable when the conveyor is at said mezzanine level for turning the turntable between one normal position in which the conveyor members are parallel to the shelf members and another normal position 180 degrees therefrom in which the conveyor members are again parallel to said shelf members, the ends of said conveyor extending out of the shaftway and passing through the intershelf spaces at opposite sides of the elevator as the turntable is rotated to turn the conveyor from one normal position to the other, and means operable when said turntable is in one of its normal positions and the conveyor is at the same level as a shelf for extending the conveyor horizontally to intermesh its members with those of the colevel shelf to transfer a load between the conveyor and shelf upon change in the level of the conveyor relative to the shelf.

3. Transfer and storage apparatus comprising two sets of generally elongated rectangular superposed vertically spaced shelves, said sets being spaced apart horizontally and disposed directly opposite each other with the lengths of the shelves in one set parallel to the lengths of the shelves in the other set and defining therebetween an elevator shaftway with one side of each shelf in one set adjacent one side of the shaftway and one side of each shelf in the other set adjacent the opposite side of the shaftway, the shaftway thus defined being of generally elongated rectangular horizontal cross-section with its length parallel to the lengths of the shelves, vertically extending elevator guide means at each end of the elevator shaftway, an elevator disposed with its length parallel to the length of the shelves and mounted between said guide means for movement up and down between the top and bottom of said shaftway, means for raising and lowering the elevator, a turntable mounted on the elevator for rotation about a vertical axis, an elongated generally rectangular conveyor carried by said turntable, the length of said conveyor being greater than the width of said shaftway, said conveyor and each of said shelves each comprising a plurality of horizontally spaced apart parallel elongated members, the shelf members running transverse to said one side of the shelf, means operable when the conveyor is at a different level from the levels of said shelves for turning the turntable between one normal position in which the conveyor members are parallel to the shelf members and another normal position 180 degrees therefrom in which the conveyor members are again parallel to said shelf members, the ends of said conveyor extending out of the shaftway and passing through the intershelf spaces at opposite sides of the elevator as the turntable is rotated to turn the conveyor from one normal position to the other, means operable when said turntable is in one of its normal positions and the conveyor is at the same level as a shelf for extending the conveyor horizontally to intermesh its members with those of the colevel shelf to transfer a load between the conveyor and shelf upon change in the level of the conveyor relative to the shelf, and two colevel torque resisting means equidistant from the turntable axis in a plane perpendicular thereto and each including support means carried by the elevator, said support means being spaced apart in the direction of the length of the elevator a distance greater than the width of the conveyor, said torque resisting means each further including correlative means carried by the turntable engaging with said support means only when said turntable is in a normal position, each of said correlative means disengaging from the adjacent support means when the turntable is rotated away from one normal position to the other, the correlative means one normal position to the other, the correlative means then passing through the intershelf spaces at opposite sides of the elevator and finally each engaging with the support means previously engaged by the other.

4. Transfer and storage apparatus comprising two sets of generally elongated rectangular superposed vertically spaced shelves, said sets being spaced apart horizontally and disposed directly opposite each other with the lengths of the shelves in one set parallel to the lengths of the shelves in the other set and defining therebetween an elevator shaftway with one side of each shelf in one set adjacent one side of the shaftway and one side of each shelf in the other set adjacent the opposite side of the shaftway, the shaftway thus defined being of generally elongated rectangular horizontal cross-section with its length parallel to the lengths of the shelves, vertically extending elevator guide means at each end of the elevator shaftway, an elevator disposed with its length parallel to the length of the shelves and mounted between said guide means for movement up and down between the top and bottom of said shaftway, means for raising and lowering the elevator, a turntable mounted on the elevator for rotation about a vertical axis, an elongated generally rectangular conveyor carried by said turntable, the length of said conveyor being greater than the width of said shaftway, said conveyor and each of said shelves each comprising a plurality of horizontally spaced apart parallel elongated members, the shelf members running transverse to said one side of the shelf, means operable when the conveyor is at a different level from the levels of said shelves for turning the turntable between one normal position in which the conveyor members are parallel to the shelf members and another normal position 180 degrees therefrom in which the conveyor members are again parallel to said shelf members, the ends of said conveyor extending out of the shaftway and passing through the intershelf spaces at opposite sides of the elevator as the turntable is rotated to turn the conveyor from one normal position to the other, means operable when said turntable is in one of its normal positions and the conveyor is at the same level as a shelf for extending the conveyor horizontally to intermesh its members with those of the colevel shelf to transfer a load between the conveyor and shelf upon change in the level of the conveyor relative to the shelf, and two colevel torque resisting means equidistant from the turntable axis in a plane perpendicular thereto and each including support means carried by the elevator, said support means being spaced apart in the direction of the length of the elevator a distance greater than the width of the conveyor, said torque resisting means further including correlative means carried by the turntable engaging with said support means only when said turntable is in a normal position, each of said correlative means disengaging from the adjacent support means when the turntable is rotated away from one normal position to the other, the correlative means then passing through the intershelf spaces at opposite sides of the elevator and finally each engaging with the support means previously engaged by the other, each of said support means including two elements spaced apart horizontally in the direction of the width of the elevator and disposed at different levels and each of said correlative means including two elements spaced apart horizontally in the direction of the width of the conveyor and disposed at different levels with each element of said correlative means engaging with a colevel element of said support means when said support means and correlative means are engaged, said elements disengaging when the turntable is rotated away from a normal position and said support means and correlative means disengage, the lower elements on said turntable traveling under the upper elements of the elevator and the upper elements of the turntable passing over the lower elements of the elevator as the turntable turns from one normal position to the other.

5. Transfer and storage apparatus comprising two sets of generally elongated rectangular superposed vertically spaced shelves, said sets being spaced apart horizontally and disposed directly opposite each other with the lengths of the shelves in one set parallel to the lengths of the shelves in the other set and defining therebetween an elevator shaftway with one side of each shelf in one set adjacent one side of the shaftway and one side of each shelf in the other set adjacent the opposite side of the shaftway, the shaftway thus defined being of generally elongated rectangular horizontal cross-section with its length parallel to the lengths of the shelves, vertically extending elevator guide means at each end of the elevator shaftway, a primary elevator disposed with its length parallel to the length of the shelves and mounted between said guide means for movement up and down between the top and bottom of said shaftway, means for raising and lowering the elevator, second vertically extending guide means carried by said primary elevator at each end of said primary elevator, a secondary elevator disposed with its length parallel to that of the primary elevator, means mounting said secondary elevator between said second guide means for movement up and down relative to the primary elevator, means for raising and lowering the secondary elevator relative to the primary elevator, a turntable mounted on the secondary elevator for rotation about a vertical axis, an elongated generally rectangular conveyor carried by said turntable, the length of said conveyor being greater than the width of said shaftway, said conveyor and each of said shelves each comprising a plurality of horizontally spaced apart parallel elongated members, the shelf members running transverse to said one side of the shelf, means operable when the conveyor is at a different level from the levels of said shelves for turning the turntable between one normal position in which the conveyor members are parallel to the shelf members and another normal position 180 degrees therefrom in which the conveyor members are again parallel to said shelf members, the ends of said conveyor extending out of the shaftway and passing through the intershelf spaces at opposite sides of the elevator as the turntable is rotated to turn the conveyor from one normal position to the other, means operable when said turntable is in one of its normal positions and the conveyor is at the same level as a shelf for extending the conveyor horizontally to intermesh its members with those of the colevel shelf to transfer a load between the conveyor and shelf upon change in the level of the conveyor relative to the shelf, and two colevel torque resisting means equidistant from the turntable axis in a plane perpendicular thereto and each including support means carried by the secondary elevator, said support means being spaced apart in the direction of the length of the secondary elevator a distance greater than the width of the conveyor, said torque resisting means each further including correlative means carried by the turntable engaging with said support means only when said turntable is in a normal position, each of said correlative means disengaging from the adjacent support means when the turntable is rotated away from one normal position to the other, the correlative means then passing through the intershelf spaces at opposite sides of the primary elevator and finally each engaging with the support means previously engaged by the other, each of said support means including elements disposed on opposite sides of the longitudinal axis of the secondary elevator adjacent the sides of the elevator shaftway spanning a distance as great as the width of the conveyor, said primary elevator being narrower than the last said distance, said means for raising and lowering the secondary elevator being disposed along the longitudinal axis of the primary elevator, said second guide means for said secondary elevator extending above and below said turntable and elevator and said mounting means for said secondary elevator including means at the ends of said secondary elevator engaging said guide means above and below said conveyor, the distance between the uppermost and lowermost points of engagement of the last said means with said second guide means being greater than the width of said elevator shaftway to facilitate resistance to torque on the turntable when turned away from normal position due to any unbalance of the loads on opposite ends of the conveyor and to facilitate resistance to torque on the turntable when in a normal position due to extension of the conveyor to transfer a load between a shelf and the conveyor.

6. Apparatus according to claim 5 in which the means to extend the conveyor horizontally includes an intermediate member between the secondary elevator and conveyor, means to move the intermediate member horizontally relative to the secondary elevator over half the width of the intermediate member, and means to move the conveyor relative to the intermediate member over half the width of the intermediate member.

7. Apparatus according to claim 6 in which said means to move the intermediate member relative to the secondary elevator comprises a rack on said intermediate member extending parallel to said conveyor members and two gears rotatably mounted on the secondary elevator and engaged with the rack on opposite sides of the longitudinal center line of said secondary elevator transverse to said conveyor members, and means to drive said gears in synchronism comprising a common pinion whose axis of rotation is on said center line.

8. Apparatus according to claim 6 in which said means to drive the conveyor relative to the intermediate member comprises a pair of sheaves rotatably mounted on the intermediate member on opposite sides of the center line of said intermediate member transverse to said conveyor beams, and two cables, each extending around one sheave and having its ends anchored respectively to the conveyor and secondary elevator on opposite sides of the center lines of said conveyor and secondary elevator from said sheaves.

9. Apparatus according to claim 6 in which said intermediate member includes two pair of oppositely facing channels, one pair at each end thereof, a symmetrical row of four horizontally spaced rollers pivotally mounted on each end of the secondary elevator and engaging the outwardly facing ones of said channels to support said intermediate member, and a symmetrical row of four horizontally spaced rollers pivotally mounted on each end of said conveyor and engaging the inwardly facing ones of said channels to support said conveyor from said intermediate member.

10. Apparatus according to claim 9 in which the innermost pairs of rollers at each end of the conveyor and at each end of the secondary elevator are coaxial.

11. Transfer and storage apparatus comprising two sets of generally elongated rectangular superposed vertically spaced shelves, said sets being spaced apart horizontally and disposed directly opposite each other with the lengths of the shelves in one set parallel to the lengths of the shelves in the other set and defining therebetween an elevator shaftway with one side of each shelf in one set adjacent one side of the shaftway and one side of each shelf in the other set adjacent the opposite side of the shaftway, the shaftway thus defined being of generally elongated rectangular horizontal cross-section with its length parallel to the lengths of the shelves, vertically extending elevator guide means at each end of the elevator shaftway, a primary elevator disposed with its length parallel to the length of the shelves and mounted between said guide means for movement up and down between the top and bottom of said shaftway, means for raising and lowering the elevator, second vertically extending guide means carried by said primary elevator at each end of said primary elevator, a secondary elevator disposed with its length parallel to that of the primary elevator, means mounting said secondary elevator between said second guide means for movement up and down relative to the primary elevator, means for raising and lowering the secondary elevator relative to the primary elevator, an elongated generally rectangular conveyor carried by said secondary elevator, the length of said conveyor being greater than the width of said shaftway, said conveyor and each of said shelves each comprising a plurality of horizontally spaced apart parallel elongated members, the shelf members running transverse to said one side of the shelf, means operable when said conveyor is at the same level as a shelf for extending the conveyor horizontally to intermesh its members with those of the colevel shelf to transfer a load between the conveyor and shelf upon change in the level of the conveyor relative to the shelf, said primary elevator being narrower than the width of the conveyor, said means for raising and lowering the secondary elevator being disposed along the longitudinal axis of the primary elevator, said second guide means for said secondary elevator extending above and below said conveyor and said mounting means for said secondary elevator including means at the ends of said secondary elevator engaging said guide means above and below said conveyor, the distance between the uppermost and lowermost points of engagement of the last said means with said second guide means being greater than the width of said elevator shaftway to facilitate resistance to torque due to extension of the conveyor to transfer a load between a shelf and the conveyor.

12. The combination of claim 1 with releasable means to lock the turntable against rotation when the turntable is in normal position, said locking means preventing binding of the conveyor and shelf members when intermeshed occasioned by slight rotation of the turntable away from normal position.

References Cited in the file of this patent

UNITED STATES PATENTS

| | | |
|---|---|---|
| 493,542 | Bessing et al. | Mar. 14, 1893 |
| 1,306,158 | Walker | June 10, 1919 |
| 1,522,600 | Strickland | Jan. 13, 1925 |
| 1,524,505 | Blue | Jan. 27, 1925 |
| 1,914,128 | James et al. | June 13, 1933 |
| 1,923,836 | Manierre | Aug. 22, 1933 |
| 2,014,351 | Becker | Sept. 10, 1935 |
| 2,428,856 | Sinclair | Oct. 14, 1947 |
| 2,480,066 | Weaver | Aug. 23, 1949 |
| 2,598,413 | Morley | May 27, 1952 |
| 2,647,647 | Alimanestiano | Aug. 4, 1953 |
| 2,678,136 | Metailler | May 11, 1954 |

FOREIGN PATENTS

| | | |
|---|---|---|
| 127,519 | Australia | May 6, 1948 |
| 728,493 | Germany | Nov. 27, 1942 |